April 30, 1957 F. T. NEWELL ET AL 2,790,655
FABRICATED SHEET METAL PIPE LINE FITTING
Filed July 11, 1952 7 Sheets-Sheet 1
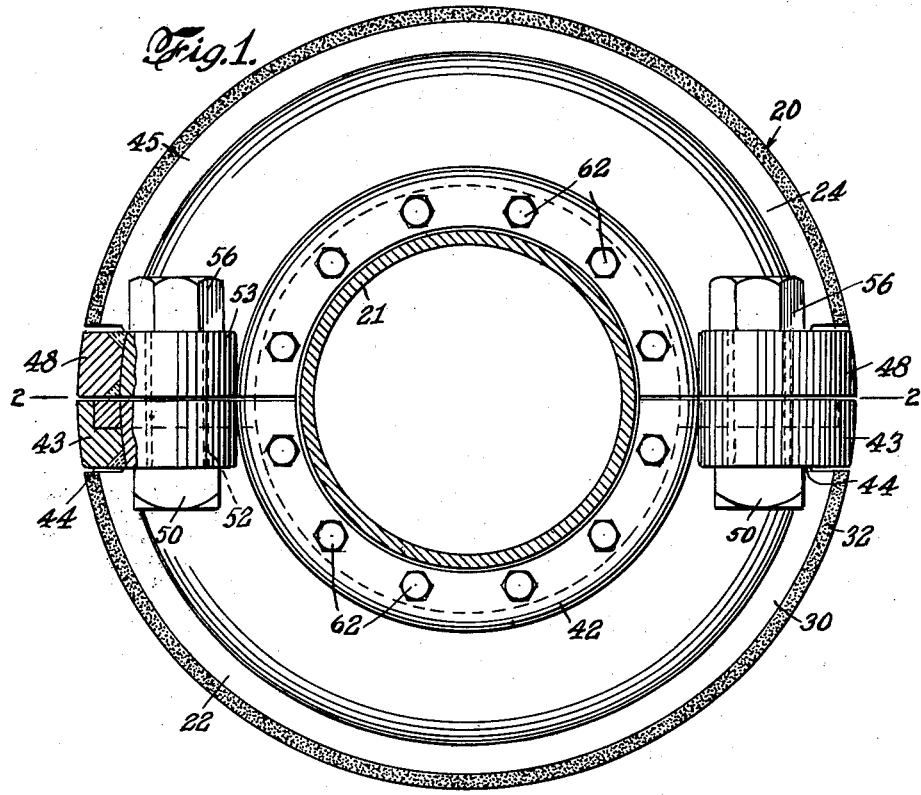
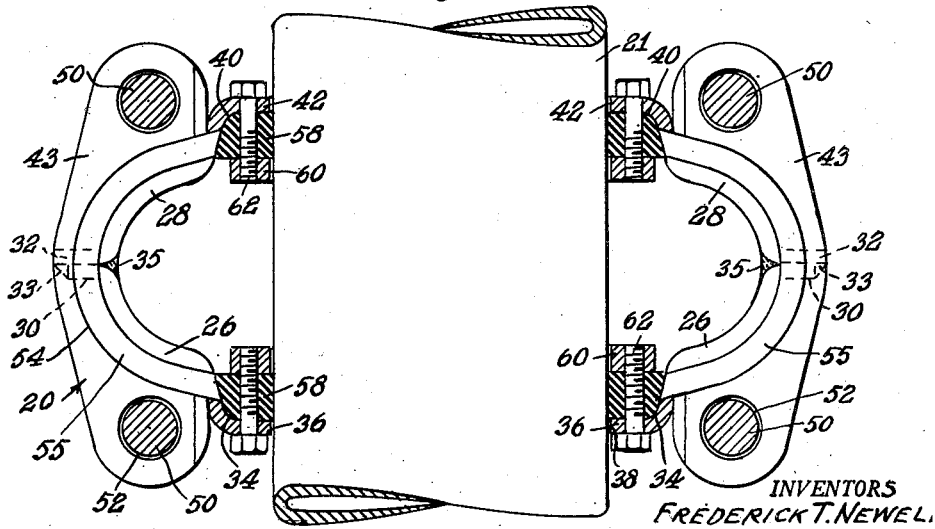
INVENTORS
FREDERICK T. NEWELL
AND ROGER E. RISLEY
BY
ATTORNEY

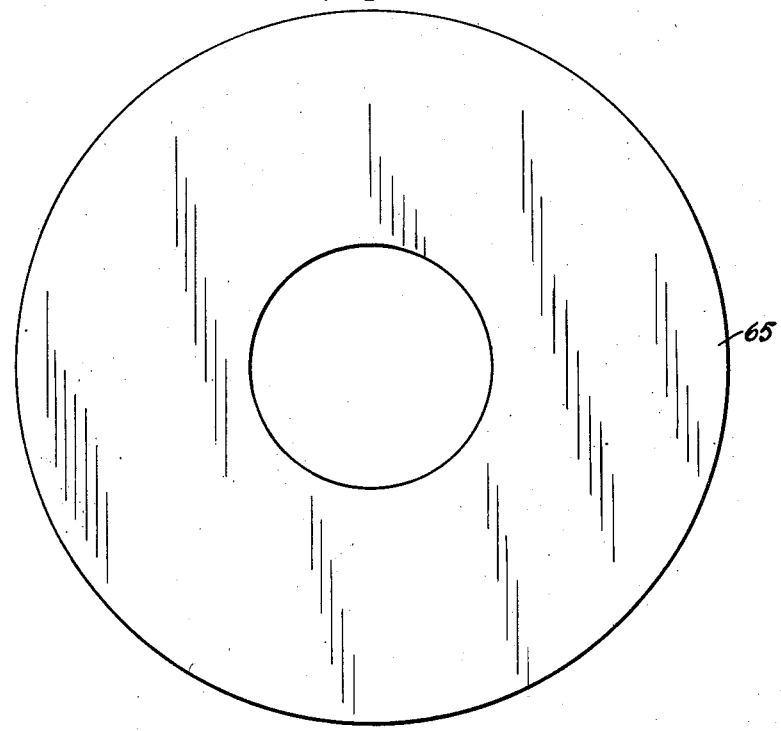
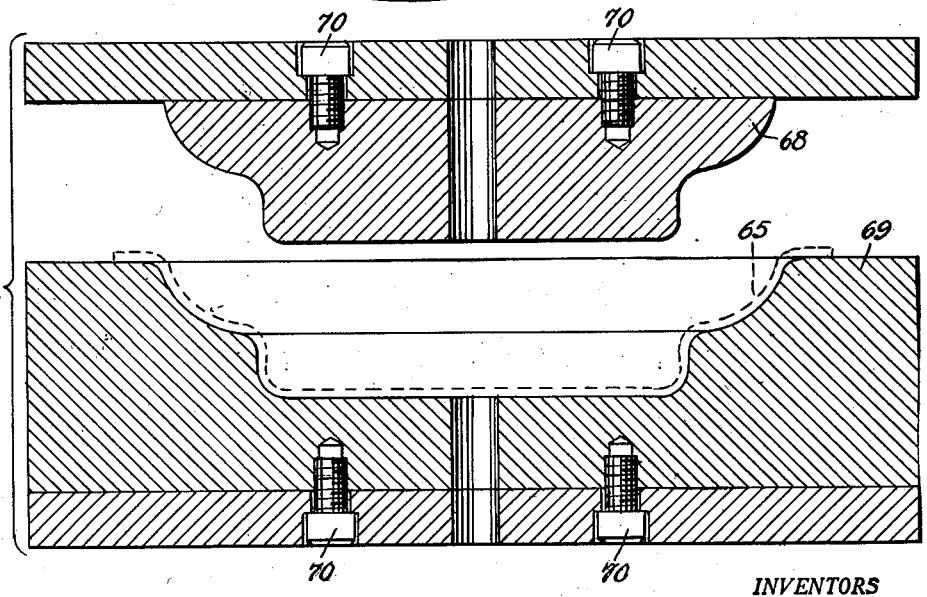

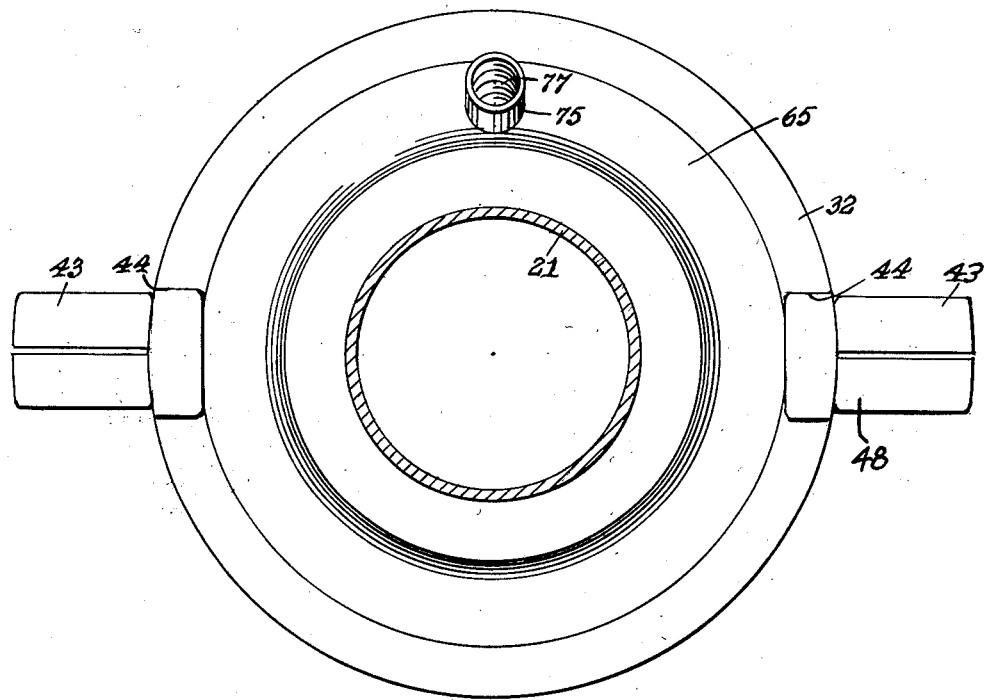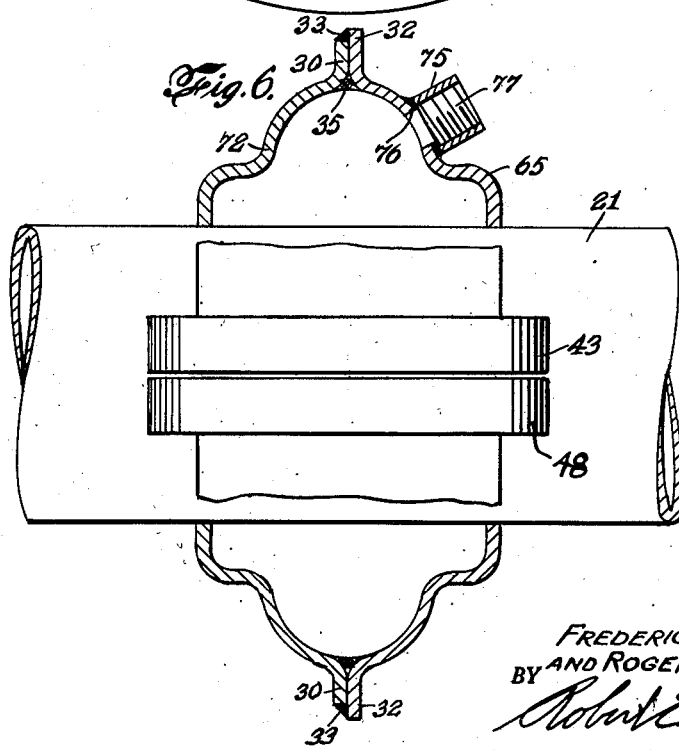

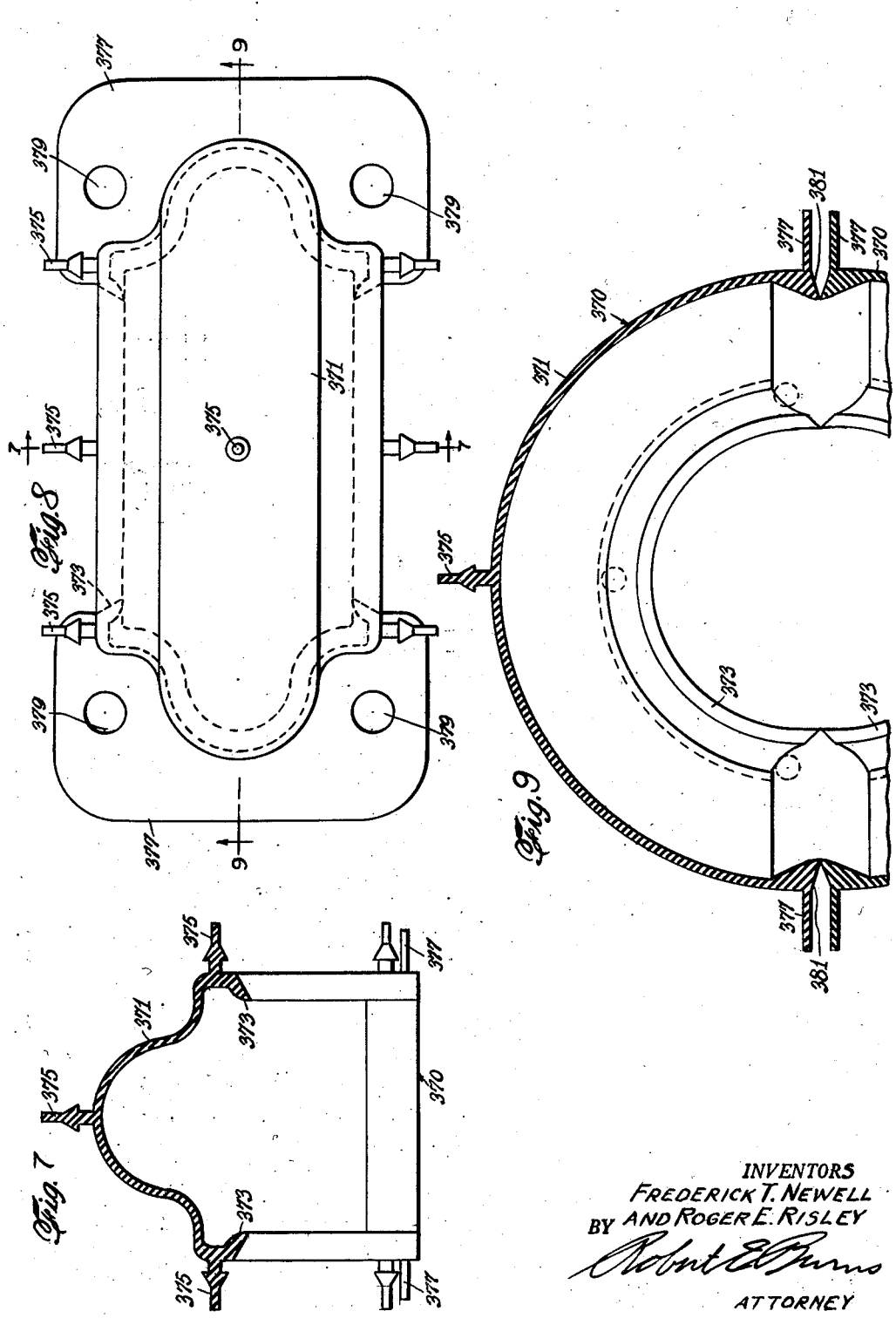

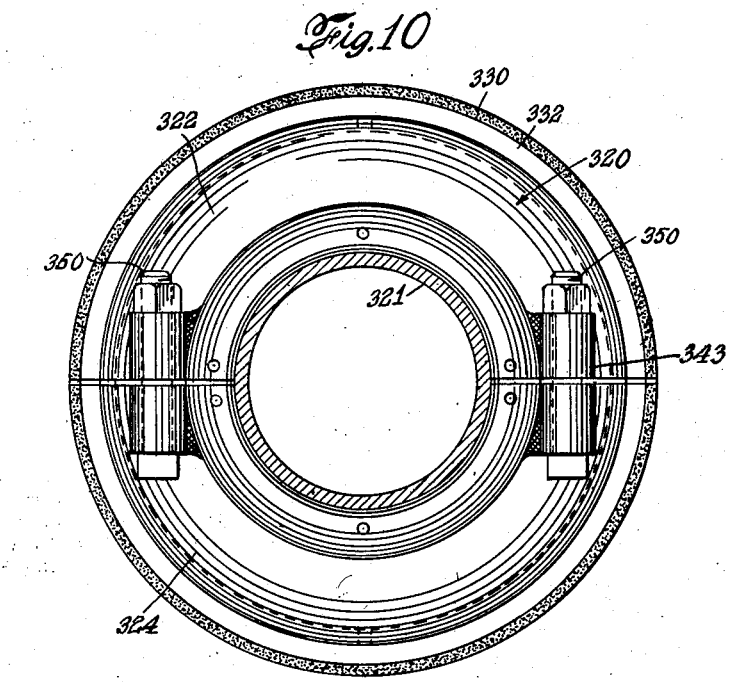
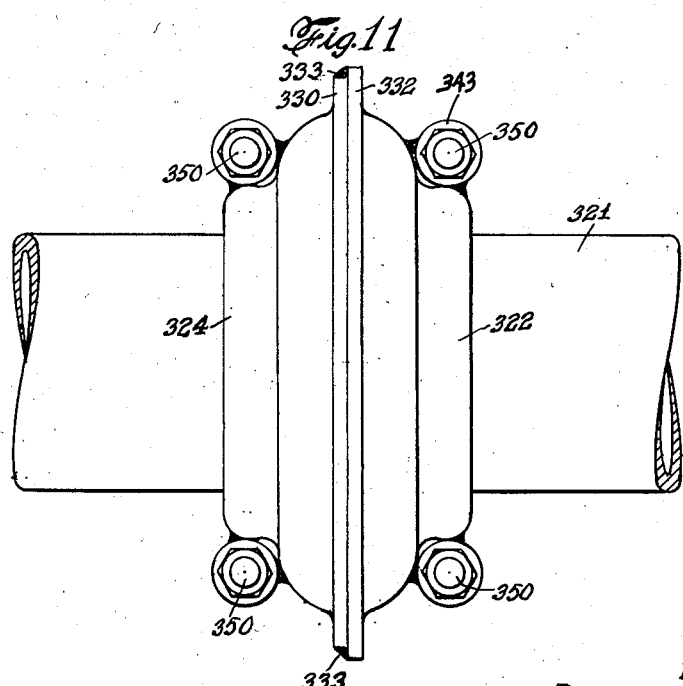

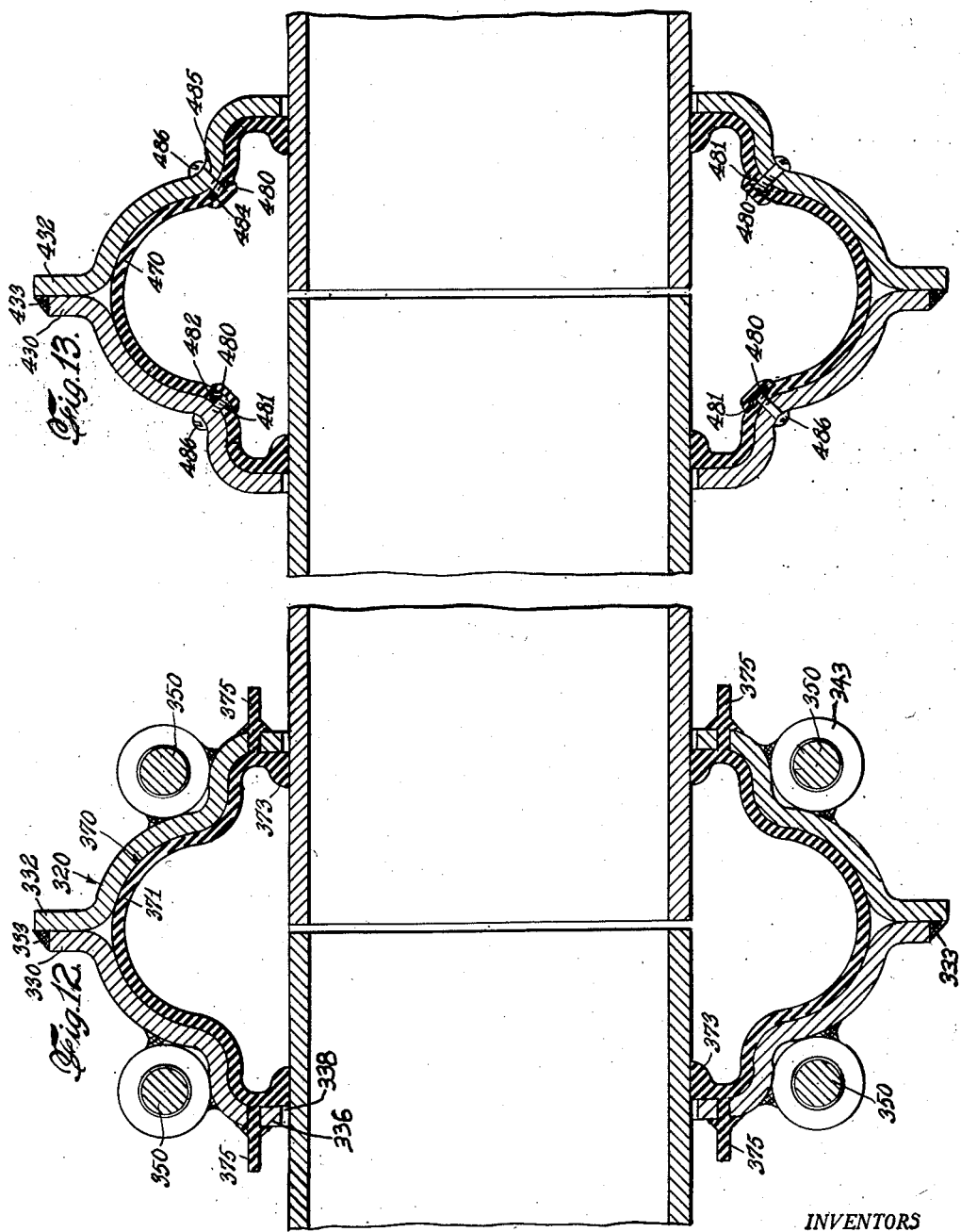

April 30, 1957    F. T. NEWELL ET AL    2,790,655
FABRICATED SHEET METAL PIPE LINE FITTING
Filed July 11, 1952    7 Sheets-Sheet 7
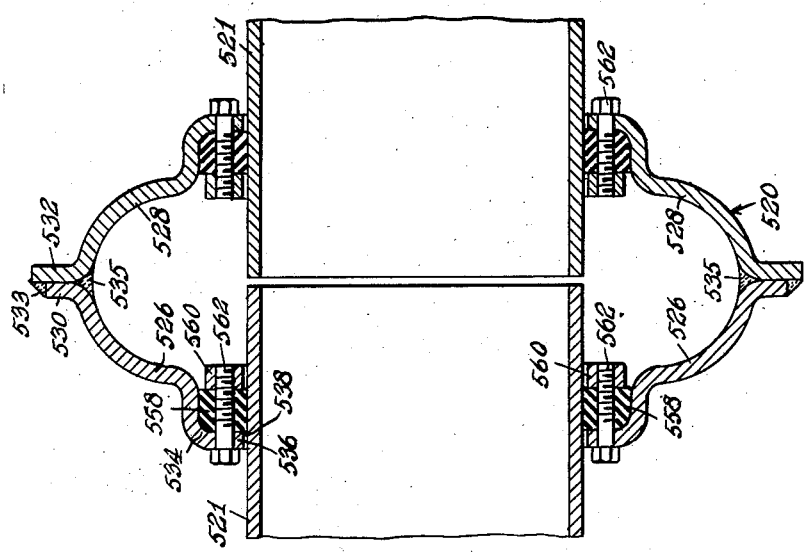
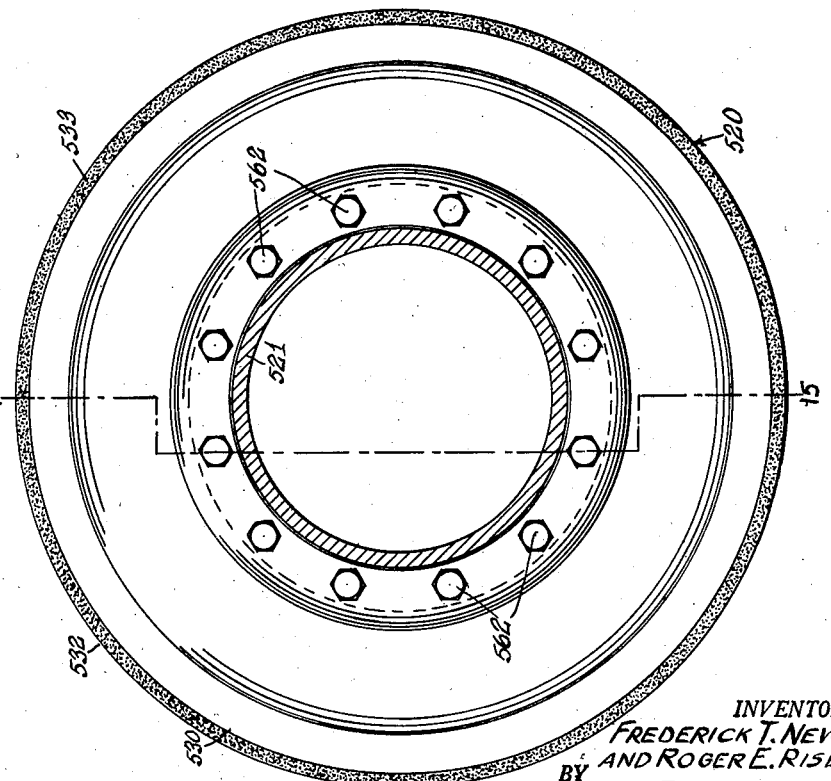
INVENTORS
FREDERICK T. NEWELL
AND ROGER E. RISLEY
BY
ATTORNEY.

United States Patent Office 2,790,655
Patented Apr. 30, 1957

2,790,655

FABRICATED SHEET METAL PIPE LINE FITTING

Frederick Thomas Newell and Roger E. Risley, Bradford, Pa., assignors to Dresser Industries, Inc., a corporation of Delaware Application July 11, 1952, Serial No. 298,296

2 Claims. (Cl. 285—373)

This invention relates to devices for enclosing a portion of a pipe line and is more particularly concerned with split repair sleeves and compression couplings for use in the construction and repair of pipe lines.

Steel and iron pipe lines used for the transmission of oil, gas, water and like fluids, both above and below ground, are formed from aligned sections of pipe which are interconnected by compression couplings. These couplings generally comprise a tubular sleeve or "middle ring" and sealing gaskets which are compressed into fluid-tight engagement with the sleeve and the external surface of the pipe sections being joined by means of followers drawn against the ends of the sleeve by bolts or similar means. Another type of coupling commonly used in pipe line construction has an internal sealing gasket which is pressed into fluid-tight engagement with the outer surface of the pipe by the pressure of the fluid being transmitted through the line.

After long periods of service, such pipe lines occasionally develop leaks at the joints between the various sections of pipe or breaks or cracks occur in the body of the pipe sections themselves. Whenever possible, these leaks, breaks and cracks are repaired without taking the pipe line apart since costly interruptions in service are thus avoided. For this purpose there has been developed the so-called split repair sleeve which has been adapted to be clamped to the portion of the pipe line to be repaired to provide a flexible yet fluid-tight seal around the faulty section of the line. These split repair sleeves are generally made of cast or wrought metal and commonly comprise two segments provided with radial flanges which are drawn together by means of side clamping bolts upon suitable packing material extending longitudinally of the segments. The ends of the segments are brought into fluid-tight engagement with the outer surface of the pipe by means of suitable gaskets and clamping rings which compress the gaskets radially against the pipe. Since the split repair sleeves must be of sufficient size to enclose a coupling so that they may be employed to repair leaking couplings when necessary, they must provide a fluid-tight enclosure of substantial dimensions. The manufacture of such split repair sleeves from cast or wrought metal is relatively difficult and expensive and various proposals have been made in the past which were aimed at the provision of a structure which is as effective and efficient as the cast and wrought metal structures but which is more easily manufactured at lower cost. These prior proposals, however, have not been entirely satisfactory for all purposes and have involved drawbacks of various nature.

In certain types of compression couplings of the character above indicated, it is desired to provide an enclosure of substantial size and these couplings have generally been formed from cast or wrought metal with the corresponding disadvantages from the standpoint of manufacturing cost and difficulty.

It is a principal object of the present invention to provide a device of improved construction for enclosing a portion of a pipe line.

It is another object of the invention to provide a split repair sleeve of the character indicated which may be easily and rapidly manufactured.

It is a further object of the invention to provide a split repair sleeve and a pipe coupling which avoid the disadvantages and drawbacks of repair sleeves and couplings which have been heretofore proposed.

In accordance with the invention there is provided a device for enclosing a portion of a pipe line, i. e. a pipe coupling, split repair sleeve, and the like, which is formed from two stamped discs which are suitably welded and cut to provide the desired device. The stamped discs, alone or in combination with an axial extension piece, as described below, provide the axial halves of the device and are shaped by a set of stamping dies from flat washer-shaped blanks. These blanks are formed from steel, copper, aluminum or other malleable metal but for most purposes steel is preferred because of its strength and relatively low cost and availability.

It is a feature of the invention that the stamped discs are adapted to be easily and rapidly welded to each other along their radial edges to provide a tubular enclosure suitable for use in the construction of the body portion of a pipe coupling or split repair sleeve of improved structure.

It is another feature of the invention that the pipe-enclosing device is adapted to be used with compression gaskets or with gaskets of the self-sealing type to provide a fluid-tight enclosure for a pipe line either at the junction between two sections of pipe or at some other portion of the pipe line.

Other objects and features of the invention will be readily apparent from the following detailed description thereof and from the accompanying drawings, wherein, Fig. 1 is an end elevational view, partly in section to show details of structure, of a split repair sleeve embodying features of the present invention;

Fig. 2 is a longitudinal sectional view taken approximately along the line 2—2 of Fig. 1;

Fig. 3 is a plan view of a blank from which a portion of the sleeve shown in Fig. 1 is formed;

Fig. 4 is a sectional view of a set of dies suitable for use in forming the split repair sleeve shown in Fig. 1;

Fig. 5 is an elevational view of one of the sleeve discs ready for welding;

Fig. 6 is a sectional view of the two complementary sleeve discs after welding and showing the provision of a vent outlet;

Fig. 7 is an axial sectional view, taken approximately along the line 7—7 of Fig. 8, of a self-sealing gasket and illustrating one means of securing the gasket to the sleeve in which it is positioned;

Fig. 8 is a top plan view of the gasket shown in Fig. 7;

Fig. 9 is a radial sectional view taken approximately along the line 9—9 of Fig. 8;

Fig. 10 is an end elevational view of a further embodiment of the split repair sleeve of the invention which is adapted primarily for use with a self-sealing gasket;

Fig. 11 is a side elevational view of the repair sleeve shown in Fig. 10;

Fig. 12 is a longitudinal sectional view of the sleeve shown in Figs. 10 and 11;

Fig. 13 is a sectional view of a split sleeve constructed in accordance with the invention and showing a modified form of securing means for the self-sealing gasket;

Fig. 14 is an end elevational view of a pipe coupling embodying features of the invention; and Fig. 15 is a longitudinal sectional view taken approximately along the line 15—15 of Fig. 14.

Referring to the drawings, and more particularly to Figs. 1 and 2, the reference numeral 20 designates generally a split repair sleeve constructed in accordance with the invention. The sleeve 20, which is shown in position on a pipe 21, is formed from two semi-cylindrical segments 22 and 24 having complementary edges which cooperate to form a radial juncture between the two segments. Segment 22 is formed from two semi-circular body members 26 and 28 which have interengaging outer radial flanges 30 and 32 respectively, and are secured to each other by welds 33 and 35. As shown in Fig. 2, body member 26 curves axially outwardly adjacent pipe 21 to define a gasket recess 34 and has a radially inwardly-directed inner flange portion 36 which defines a pipe aperture 38 through which the pipe 21 extends. Similarly, body member 28 provides a gasket recess 40 and has an inner flange 42. The edges of sleeve segment 22 at the radial juncture between the two segments are provided with side bars 43 which are welded to the outer surface of the segment 22, the outer radial flanges 30 and 32 being cut away, as shown at 44, to receive the side bars. The sleeve segment 24 is in like manner formed from two semi-circular body members 45 and 46 welded together along their radial edges and provided with side bars 48 of the size and shape of side bars 43.

The sleeve segments 22 and 24 are interconnected about the pipe 21 by bolts 50 passing through aligned apertures 52 and 53 in the side bars 43 and 48, respectively. Since the split repair sleeve 20 is intended to enclose a leaking portion of a pipe line to prevent further leakage it must obviously form a fluid-tight enclosure around the pipe. Fluid-tightness of the sleeve is insured by the provision of suitable gaskets between the side bars 43 and 48 and at the axial ends of the sleeve adjacent the pipe apertures through which the pipe 21 is received. Referring to Figs. 1 and 2, the faces of the side bars 43 and the adjacent areas of the segment 22 are formed with grooves 54 which extend from the gasket recess 34 to the gasket recess 40. As seen in Fig. 2, the side bar grooves 54 follow the curvature of the body members 26 and 28 and have one edge abutting these members. Seated in the grooves 54 are side bar strips or gaskets 55 which are adapted to be radially expanded into sealing engagement with the faces of side bars 48 when the two sleeve segments are drawn together by means of bolts 50 and cooperating nuts 56. The positions of the bolt apertures 52 and 53 are such that sufficient pressure is applied to the side bar strips 55 when the bolts are drawn up to provide an effective, fluid-tight seal along the juncture between the sleeve segments 22 and 24.

The side bar strips 55 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined.

The portions of the split repair sleeve 20 adjacent the pipe 21 are similarly effectively sealed against escape of fluid from within the sleeve. For this purpose, end gaskets 58 are positioned in the gasket recesses 34 and 40. End gaskets 58 are advantageously semi-circular in form with abutting or overlapping ends and are formed from the same type of material as that used in the formation of side bar gaskets 55, i. e. a material which is relatively firm and solid but sufficiently resilient and elastic to flow under pressure to conform to the surfaces between which it is confined. The end gaskets 58 are expanded radially into fluid-tight engagement with the outer surface of pipe 21 by means of followers 60 which are drawn axially-outwardly by follower bolts 62 threadedly engageable with the followers 60 and passing through aligned apertures in the gaskets 58 and in the inner flange portions 36 and 42 of the sleeve segments. When the follower bolts 62 are tightened, the followers 60 are drawn toward the inner flange portions and axially compress the gaskets 58, thereby radially expanding the gaskets into fluid-tight sealing engagement with the adjacent surfaces of the pipe 21 and the sleeve 20.

It is a feature of sleeve 20, in accordance with the invention, that it is manufactured by welding together two washer-shaped malleable metal blanks which are first stamped by means of suitable dies to provide the desired shape. The materials and the steps employed in forming the above-described sleeve 20 are shown in Figs. 3–5. Referring to these figures, the reference numeral 65 designates the washer-shaped blank which is employed and which provides the body members 26 and 45 of sleeve 20. Blank 65 is stamped into shape by cooperating dies 68 and 69 shown in cross-section in Fig. 4, the stamped blank being shown in dotted lines. The dies 68 and 69 are brought together in interengaging relationship by any convenient means, e. g. hydraulically or mechanically, or by other means employed in the metal stamping art. As shown in Fig. 4, the die members are for convenience, removably secured by screws 70 to base plates.

The blank 65 after stamping by the dies 68 and 69 corresponds to the body members 28 and 46 of sleeve 20 and as shown in Fig. 5, the radial flange 32 has been cut away at 44 to receive the side bars. The other axial half of the sleeve 20 is provided by a stamped blank 72 which is identical in shape with stamped blank 65 but is of slightly less diameter, as shown in Fig. 6. The blank 72 corresponds to the body members 26 and 45 of sleeve 20, and as shown in Fig. 6, the outer radial flange 30 is of lesser radial width than flange 32. Like blank 65, blank 72 has a portion of its periphery cut away to accommodate the side bars. The stamped blanks 65 and 72 are then welded together by welds 33 and 35, and the side bars 43 and 48 are welded into position, a small clearance being left between the opposed faces of the side bars, as shown in Fig. 6. The sleeve 20 is thus formed, but at this stage it is a continuous, rather than a split, sleeve. To form the two independent sleeve segments 22 and 24, the sleeve as above constructed is cut along the radial plane passing between the two sets of side bars, i. e. the plane upon which the sectional view of Fig. 2 is taken and the grooves 54 are cut in the side bars of sleeve segment 22 and the adjacent areas of this segment. To permit sleeve 20 to be vented, if desired, there is advantageously provided a closable vent 75 formed by an internally-threaded pipe section welded to the exterior surface of blank 65, as shown in Fig. 5, and communicating with an aperture 76 formed in the wall of the blank. A removable plug 77 serves to close the vent 75.

It will thus be seen that in accordance with the invention, a split repair sleeve may be easily formed from steel or other malleable metal and that the need for forming cast sleeve segments is eliminated. A more rugged sleeve is thereby provided and the time and manpower required for production is materially reduced.

In the above-described embodiments of the invention, the line of juncture between the sleeve segments has been sealed against escape of fluid from the interior of the sleeve by means of strips of compressible material which are compressed when the side bar bolts are drawn up and when the follower bolts are tightened. Fluid-tightness of the sleeve may also be achieved by means of a so-called "self-sealing" gasket, suitably shaped and constructed to fit the split sleeves. A self-sealing gasket suitable for use with above-described sleeves 20 and 120 is shown in Figs. 7, 8 and 9.

As shown in the drawing, the self-sealing gasket is formed from two semi-circular halves 370 which are shaped to conform to the interior surface of each split sleeve segment. The gasket halves 370, like the gaskets employed in the above-described embodiments, are formed from rubber or rubber composition, or like deformable elastic material. As shown in Fig. 7, the gasket half 370 is channel-shaped and the lateral ends of the walls 371 of the gasket half are formed with inwardly-extending annular pipe-engaging lips 373 which are adapted to be pressed sealingly against the outer surface of the pipe around which the gasket is positioned by the pressure of the fluid passing through the pipe and flowing into the interior of the gasket.

The gasket halves 370 are secured to the sleeve segment by any convenient securing means. In the embodiment shown in Figs. 7–9, the gasket halves are formed with integral pull tabs 375 which pass through suitable apertures provided in the walls of the sleeve segments, for example, the apertures used for receiving the follower bolts when annular gaskets of the type shown in Fig. 2 are used.

In order to seal the gasket halves at their longitudinal meeting ends and thus to provide a fluid-tight enclosure within the split sleeve, these ends are provided with radially outwardly-extending ears 377 adapted to extend between the side bars of the split sleeve and formed with apertures 379 to accommodate the side bar bolts. The longitudinal meeting ends are also provided with lips 381 and adjacent these lips the ends are formed with a thickened portion which reinforces the gasket and serves the important purpose of urging the lips of the cooperating gasket halves against each other to apply initial sealing pressure. The pressure of the fluid in the gasket when the sleeve is in service also, of course, exerts a force which presses the lips together.

While the gasket halves 370 may be positioned in split sleeve segments of the form above-described and in which the followers and the annular gaskets have been removed, the self-sealing gasket halves are also advantageously used with a split repair sleeve embodying the structural features of the invention but having a structure differing in some respects from that of the sleeve shown in Figs. 1 and 2. Referring, for example, to Figs. 12, 13 and 14, wherein parts corresponding to those shown in Figs. 1 and 2 have been given the same reference numerals to which 300 has been added, the sleeve 320 is formed from two semi-cylindrical sleeve segments 322 and 324 having inter-engaging outer radial flanges 330 and 332. The ends of the sleeve are formed by inwardly-directed inner flange portions 336 defining pipe apertures 338 and provided with apertures for receiving the pull tabs 375 of the gasket halves 370. Instead of side bars of the structure shown in Fig. 2, sleeve 320 has welded to its outer surface bolt-holding cylindrical members 343. In view of the self-sealing nature of the gasket used with sleeve 320 it is not necessary to provide side bars with a groove for receiving the side bar gasket. The bolts 350, passing through the apertures in the cylindrical members 343, hold the sleeve segments together and bring the edges of the sleeve segments into firm engagement with the surfaces of the ears 377 of the gasket halves 370. As in the case of the sleeve shown in Figs. 1 and 2, the sleeve 320 is advantageously first formed as a unitary whole from two stamped discs welded together along their opposed edges. The cylindrical members 343 are initially in the form of elongated cylinders and are welded to the sleeve 320 with their midpoints on the line through which the longitudinal split will be made. The sleeve and the cylinders are then cut longitudinally to provide the two sleeve segments. The gasket halves 370 are mounted in the sleeve segments by passing the pull tabs 375 through the apertures in the sleeve formed for this purpose.

The pull tabs 375 are one convenient means for securing the gasket halves in the sleeve segments. Other securing means, such as shown in sectional Fig. 13, may be employed. In this figure there is shown a gasket 470 which is secured to the sleeve with which it is associated by a screw and nut arrangement. The gasket 470 is formed with enlargements or bosses 480 which are molded at spaced-apart points in the gasket. Nuts 482 are molded into the bosses 480 during manufacture of the gasket, the mold being suitably provided with removal pins which extend from the exterior of the gasket into the apertures of the nuts. When the pins are removed, openings 484 remain and provide access to the nuts. The sleeve is provided with apertures 485 in alignment with the openings 484 and screws 486 are inserted through the apertures 485 and the openings 484 into threaded engagement with the nuts 482. This arrangement effectively secures the gasket 470 in the sleeve without providing an opportunity for leakage of fluid from the interior enclosure defined by the gasket. Alternatively, the gasket may be secured in the sleeve by adhesive means or the like.

In the foregoing description, the invention has been discussed with particular reference to embodiments in the form of split repair sleeves adapted to be applied to a pipe line around a leaking or damaged coupling or other portion of the line. As previously mentioned, however, the invention may also be embodied in a pipe coupling of the integral sleeve type, i. e. a pipe line enclosing device having a continuous, as distinguished from "split," sleeve. Figs. 14 and 15 show a coupling of this type embodying features of the present invention. In these figures parts corresponding to those shown in the embodiment of Figs. 1 and 2 have been given the same reference numerals to which 500 has been added.

As shown in Fig. 15, the sleeve 520 is a unitary cylindrical body formed from two dish-shaped axial halves 526 and 528 having radial flanges 530 and 532 and secured together in fixed relationship by welds 533 and 535. The sleeve 520 has inner flange portions 536 defining pipe apertures 538 and gasket recesses 534 and provided with apertures for receiving bolts 562 for drawing up the followers 560 to compress the gaskets 558. The gaskets 558 and followers 560 may be of unitary circular construction since the sleeve 520 is intended to have the ends of the pipe sections 521 stabbed into it, or they may take the form of the end gaskets and followers of the embodiment of Figs. 1 and 2.

It will be apparent that the method of manufacture described above in connection with sleeve 20 of Figs. 1 and 2 is employed in the manufacture of sleeve 520 with the exception that the cutting of the outer radial flanges to accommodate the side bars and the provision of the side bars are unnecessary. Similarly, the step of bisecting the assembled sleeve is eliminated.

Sleeve 520 may, like sleeve 120, be formed without the peripheral rib provided by the radial flanges 530 and 532 and may thus have a smooth curved exterior. In like manner the sleeve 520 may be extended longitudinally, if desired, by providing a cylindrical spacing member between the opposed edges of the dish-shaped axial halves 526 and 528. Instead of the end gaskets 558, sleeve 520 may be provided with a self-sealing gasket of known construction and comprising a continuous tubular member having lips formed on its edges similar to the lips 373 of the self-sealing gasket halves shown in Fig. 7.

It will be obvious that various other changes and modifications may be made without departing from the scope of the invention as defined in the appended claims and it is intended, therefore, that all matter contained in the foregoing description and in the drawings shall be interpreted as illustrative and not in a limiting sense.

What we claim and desire to secure by Letters Patent is:

1. A device for enclosing a portion of a pipe line to provide a fluid-tight enclosure therefor, which comprises a tubular sleeve having pipe apertures at its axially opposite ends, said sleeve being split longitudinally on a plane passing through the axis thereof and bisecting said pipe apertures to provide two sleeve segments, said segments having cooperating longitudinal edge portions, means providing a fluid tight seal between the edge portions of the two segments and flange means welded adjacent said edge portions for cooperating with bolt means for releasably inter-connecting said sleeve segments, each of said sleeve segments being formed from two segment portions formed from malleable sheet metal of substantially uniform thickness connected by welding along their rims substantially at the axial center of each segment, each of said segment portions defining an axial half of each segment and one-half of each pipe aperture and together defining in said sleeve a bulged central portion of substantially greater internal diameter at its axial center than said pipe apertures, the rims of said segment portions defining an annular rib extending radially outwardly from substantially the axial center of said bulged central portion, said rims defining said rib being welded exteriorly and interiorly of said central portion of the sleeve, and gasket means for providing a fluid-tight seal between the portions of the sleeve adjacent said pipe apertures and the pipe line extending through said apertures.

2. A device for enclosing a portion of a pipe line to provide a fluid-tight enclosure therefor, which comprises a tubular sleeve having pipe apertures at its axially opposite ends, said sleeve being split longitudinally on a plane passing through the axis thereof and bisecting said pipe apertures to provide two sleeve segments, said segments having cooperating longitudinal edge portions, means providing a fluid tight seal between the edge portions of the two segments and flange means welded adjacent said edge portions for coperating with bolt means for releasably inter-connecting said sleeve segments, each of said sleeve segments being formed from two segment portions formed from malleable sheet metal of substantially uniform thickness, said portions having radially outwardly extending flanges along their rims, said flanges being interconnected by welding substantially at the axial center of each segment, each of said segment portions defining the axial half of each segment and one-half of each pipe aperture and together defining in said sleeve a bulged central portion of substantially greater internal diameter at its axial center than said pipe apertures, the interconnected flanges of said segment portions defining an annular rib extending radially outwardly from substantially the axial center of said bulged central portion, said flanges defining said rib being welded exteriorly and interiorly of said central portion of the sleeve, and gasket means for providing a fluid-tight seal between the portions of the sleeve adjacent said pipe apertures and the pipe line extending through said apertures.

References Cited in the file of this patent
UNITED STATES PATENTS

| | | |
|---|---|---|
| 172,844 | Brownlow | Feb. 1, 1876 |
| 1,252,888 | Dorsey | Jan. 8, 1918 |
| 1,571,343 | Register | Feb. 2, 1926 |
| 1,607,943 | Carson et al. | Nov. 23, 1926 |
| 1,818,985 | Burnish | Aug. 18, 1931 |
| 1,830,782 | Burnish et al. | Nov. 10, 1931 |
| 1,974,160 | Peirson | Sept. 18, 1934 |
| 2,036,320 | Connelly et al. | Apr. 7, 1936 |
| 2,041,132 | Johnson | May 19, 1936 |
| 2,197,450 | Curtis | Apr. 16, 1940 |
| 2,209,403 | Kittner et al. | July 30, 1940 |
| 2,217,664 | Berger | Oct. 15, 1940 |
| 2,353,466 | Heintz et al. | July 11, 1944 |
| 2,368,200 | Cavanagh | Jan. 30, 1945 |
| 2,509,363 | Page | May 30, 1950 |
| 2,573,530 | Zallea et al. | Oct. 30, 1951 |
| 2,708,307 | Newell et al. | May 17, 1955 |